UNITED STATES PATENT OFFICE.

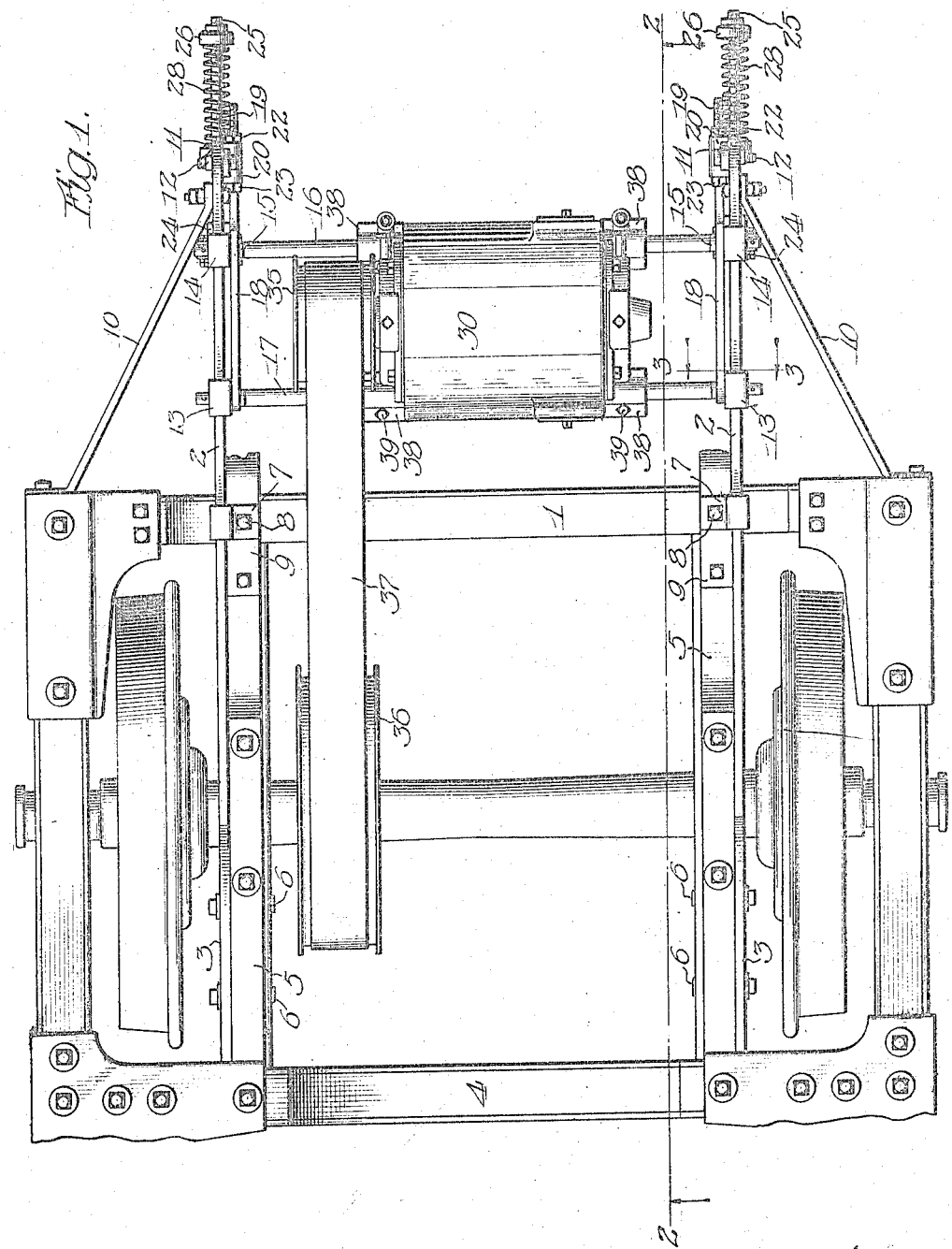

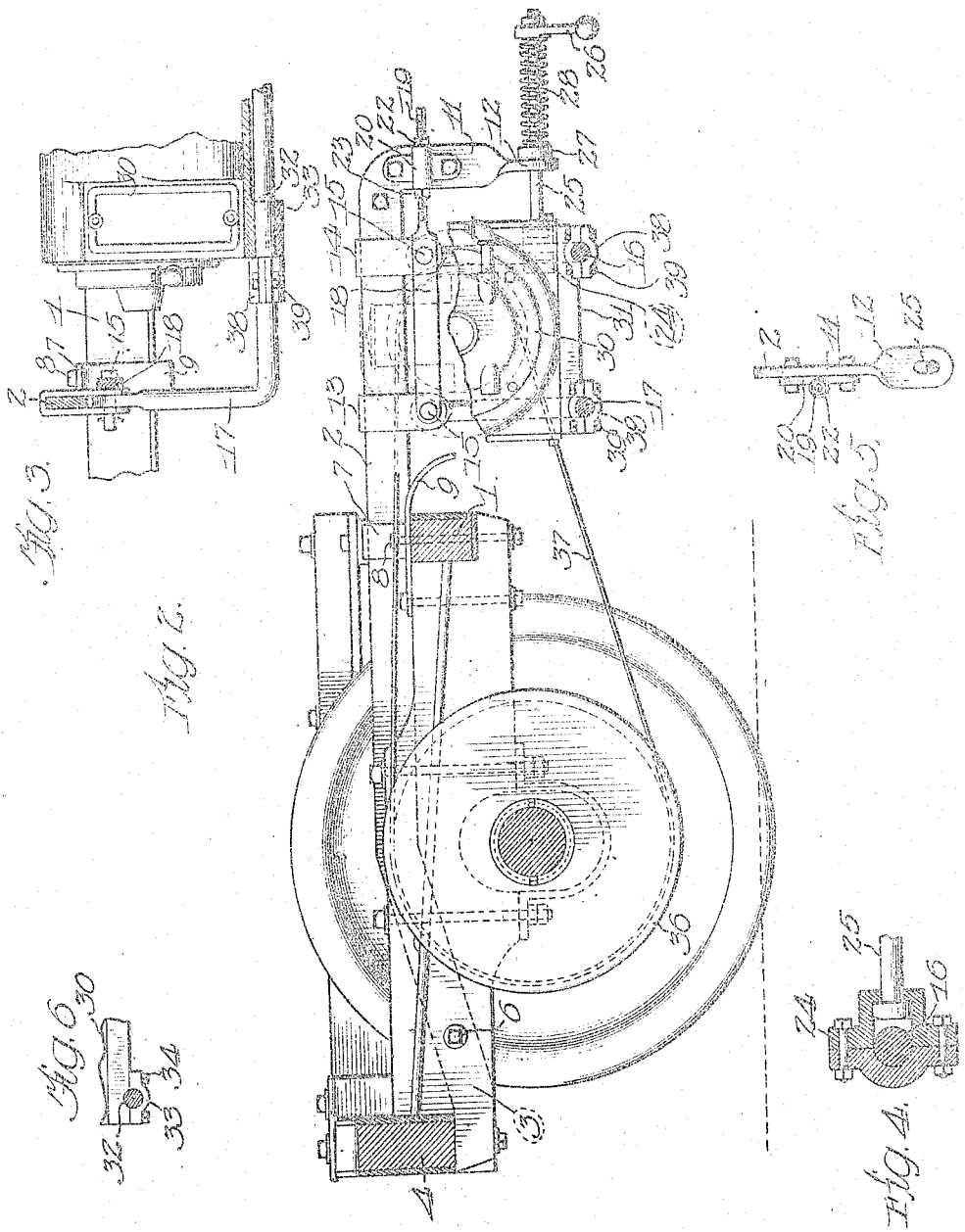

WILLIAM L. BLISS, OF BROOKLYN, NEW YORK, ASSIGNOR, BY MESNE ASSIGNMENTS, TO CENTRAL TRUST COMPANY OF NEW YORK, TRUSTEE, A CORPORATION OF NEW YORK.

SUPPORT FOR DYNAMO-ELECTRIC MACHINES.

1,131,200.

Specification of Letters Patent.

Patented Mar. 2, 1915.

Application filed April 22, 1909. Serial No. 491,704.

*To all whom it may concern:*

Be it known that I, WILLIAM L. BLISS, a citizen of the United States, residing at Brooklyn, in the county of Kings and State of New York, have invented new and useful Improvements in Supports for Dynamo-Electric Machines, of which the following is a full, clear, concise, and exact description, reference being had to the accompanying drawing, forming a part of this specification.

My invention relates to improvements in generator suspensions.

More particularly it relates to means for mounting generators, or other dynamo electric machines, on car trucks in such a manner that the same may be driven from the car axle by means of a belt or other suitable power transmitting means. When a generator is mounted upon a car truck to be driven from the car axle by a belt, it is essential that the generator be so disposed that its armature shaft is substantially parallel to the car axle and the pulley on its armature shaft substantially in alinement with the pulley on the car axle.

One object of my invention is to provide supporting means which may be readily installed on practically any car truck, and which will permit of proper adjustment of the generator.

A further object of my invention is to provide means for so mounting the generator that the same will be readily accessible for inspection and repairs, or for removal.

Another object of my invention is to provide means for supporting a generator in such a manner from a car truck that it may be readily mounted in position or dismounted.

Another object is to support a generator on a car truck so as to provide proper operating clearance for the generator without necessitating any substantial modification of the standard construction of under frame and truck of the car.

For the purpose of more fully disclosing the characteristics of my invention, I shall describe the embodiment thereof illustrated in the accompanying drawings.

Of course, my invention is susceptible of various modifications.

In the drawings,—Figure 1 is a top plan view of a portion of a car truck having a generator mounted thereon; Fig. 2 is a sectional view taken on line 2—2, Fig. 1, the upper part of the generator being shown in dotted lines for the purpose of more clearly disclosing the construction of the support therefor; Fig. 3 is a sectional view taken on line 3—3, Fig. 1, and Figs. 4, 5 and 6, are detail views.

The car truck illustrated is of ordinary construction and need not be described specifically.

Resting on the end sill 1 of the car truck, and projecting beyond the same, are a pair of substantially parallel supporting bars 2, which are preferably provided with extensions 3 which engage the under side of the transom 4 of the truck. The bars 2 are preferably arranged on the outside of the wheel guards 5 of the truck and secured thereto by means of bolts 6. Of course, the bars 2 may be secured to the truck in any other preferred manner. The bars 2 are preferably secured to the end sill by clamping members or clips 7. In practice I prefer to utilize the bolts 8 of the brake springs for securing the clamping members 7 to the end sill, as this obviates the necessity of drilling additional holes through the end sill. For reinforcing the projecting ends of the bars 2, I preferably provide the same with braces 10, secured to the truck. At their outer ends the bars 2 are preferably provided with downwardly extending portions 11, the extremities 12 of which are preferably twisted at right angles thereto for the purpose hereinafter set forth. It should here be noted that the bars 2, and their braces, are the only parts of the supporting mechanism which are secured to the car truck, and that the attachment of these members in no wise injures the truck.

Slidably mounted on each of the bars 2 are two stirrups, 13 and 14, each of which is preferably substantially U-shaped. Pivotally connected to the stirrups 14 by pins 15 is a sling 16, and pivotally suspended from the stirrups 13 is a sling 17. The slings 16 and 17 are preferably of the same size and formed of cylindrical rods, although of course I do not limit myself to this construction. The slings are each substantially U-shaped and are constructed with depending end members or links pivoted to the stirrups and with cross-bars connecting the lower portions of each pair of links together. In the form illustrated, the links and cross-bars are integral. It is apparent, however, that the links and cross-bars need not be integral and that the parts may assume various other forms. The stirrups 13 and 14, on each of the bars 2, are preferably held in spaced relation, and an equal distance apart, by spacing bars 18 which are connected thereto by the pins 15 which support the slings 16 and 17. Each of the spacing bars 18 has a screw-threaded extension 19, which passes through a guide 20 bolted or otherwise secured to the downward extension 11 of one of the suspension bars 2. Each of the screw-threaded extensions 19 carries nuts 22 and 23, arranged on opposite sides of the guide 20. By adjusting the nuts 22 and 23, the stirrups on either of the bars 2 may be adjusted longitudinally thereon, thereby moving the members or slings 16 and 17 laterally. The purpose of this adjustment will be hereinafter set forth.

Secured to the opposite sides of the sling 16, by suitable clamping members 24, (Fig. 4), are tension rods 25. Each of the rods 25 passes through the extremity 12 of one of the bars 2, and is provided at its end with a screw-threaded portion onto which is threaded a tension nut 26. Surrounding each of the rods 25, and interposed between the tension nuts 26 and spring seats 27, which bear against the portions 12 of the bars 2, are tension springs 28.

The generator, or other dynamo electric machine, 30, which may be of any preferred type, is adapted to be supported by the U-shaped slings 16 and 17 in a manner which I shall now describe.

In the device illustrated, the generator is suitably secured to a bed plate 31, which is provided at opposite sides with the bearing portions 32, (Figs. 3 and 6), for receiving the cross-bars of the slings 16 and 17. The bearing portions 32 are provided with caps 33, secured in place by bolts 34. The bed plate thus serves to hold the cross-bars in spaced and parallel relation. While the bed plate is securely fixed to the slings 16 and 17 by the caps 33, yet it is free to slide longitudinally of the cross-bars and the cross-bars are free to turn in the bearing portions 32. The generator should be so mounted on the bed plate that the armature shaft is substantially parallel to the cross-bars of the slings 16 and 17.

While I have shown the generator mounted on a bed plate, it should be understood that the generator casing might be directly secured to the slings, or might have a bed plate formed integrally therewith or might be supported in various other ways.

The armature shaft of the generator carries a pulley 35 adapted to be driven from a pulley 36 on the car axle by means of a belt 37.

To adjust the generator to bring its armature shaft into parallel relation with the car axle, it is only necessary to shift one or both ends of the slings 16 and 17 laterally, in the manner previously set forth. The desired slack of the belt can also be obtained in the same manner, that is, by adjusting the nuts 22 and 23. To render the pulley on the armature shaft in alinement with the pulley on the car axle, it is only necessary to slide the generator longitudinally of the cross-bars. To prevent longitudinal movement of the generator, after proper adjustment, I provide on the cross-bars stops 38, arranged on opposite side of the bed plate and adapted to be clamped to the cross-bars. The stops are formed in two parts secured together by bolts 39. To regulate the tension on the belt, it is only necessary to adjust the tension nuts.

Inasmuch as the slings 16 and 17 are of the same size and are held in the same spaced relation, both at the top and bottom, a parallel motion is produced whereby, when the links swing back and forth, the generator always remains horizontal, its armature shaft always parallel to the car axle and its pulley always in alinement with the pulley on the car axle. It is apparent that the generator is supported on or in a swinging cradle, carriage or frame. With this arrangement the generator is always easily accessible and may be readily removed from its supporting slings by removing the caps 33. It may also be as easily replaced.

The accessibility of the generator is due to a great extent to the fact that I eliminate the cross bar connecting the outer ends of the supporting bars, which is usually found in suspensions of this general character and which of necessity impedes access to the generator.

In a co-pending application, Ser. No. 565,267, filed June 6, 1910, I have described and claimed a somewhat similar generator suspension applied to a steel car truck.

I do not desire to limit myself to the form of device described above nor to the details thereof, as it is apparent that this form was selected for the purpose of illustration only. I desire therefore to include any suitable equivalent means for accomplishing the desired results and falling within the scope of the appended claims.

Having thus described my invention, what I claim as new and desire to secure by Letters Patent, is:—

1. In a support for dynamo electric machines, in combination, a pair of substantially U-shaped members pivotally supported and arranged substantially parallel.

2. In a support for dynamo electric machines, in combination, a pair of substantially parallel supporting bars, and a pair of substantially parallel U-shaped members pivotally suspended from said bars.

3. In a support for dynamo electric machines, in combination, a pair of substantially parallel supporting bars, and a pair of U-shaped slings pivotally suspended from said bars and movable longitudinally thereof.

4. In a support for dynamo electric machines, in combination, a pair of substantially parallel supporting bars, a pair of U-shaped members pivotally suspended from said bars and arranged substantially at right angles thereto, said members being movable longitudinally of said bars, and means for holding said members in spaced relation.

5. In a support for dynamo electric machines, in combination, a pair of substantially parallel supporting bars, a pair of sliding members carried by each of said bars, a pair of substantially parallel U-shaped slings pivoted to said sliding members and arranged substantially at right angles to said bars, and means for holding the sliding members in spaced relation and adjusting the same longitudinally of said bars.

6. In combination, a pair of substantially U-shaped slings pivotally supported and arranged substantially parallel, and a dynamo electric machine secured to said slings and adapted to maintain the same in spaced and parallel relation.

7. In combination, a pair of substantially parallel supporting bars, a pair of substantially parallel U-shaped slings pivotally suspended from said bars, and a dynamo electric machine secured to said slings and adapted to maintain the same in spaced and parallel relation.

8. In combination, a pair of substantially parallel supporting bars, a pair of substantially parallel U-shaped slings pivotally suspended from said bars and arranged substantially at right angles thereto, said slings being movable longitudinally of said bars, means for holding said slings in spaced relation, and a dynamo electric machine carried by said slings and adapted to maintain the same in parallel relation.

9. In combination, a pair of substantially U-shaped slings pivotally supported and arranged substantially parallel, and a generator carried by said slings and adapted to hold the same in spaced and parallel relation, said generator being adjustable longitudinally of said bars.

10. In combination, a pair of substantially parallel supporting bars, a pair of substantially parallel U-shaped slings pivotally supported by said bars substantially at right angles thereto, said slings being adjustable longitudinally of said bars, and a dynamo electric machine carried by said slings and adapted to hold the same in spaced and parallel relation, said machine being adjustable longitudinally of said bars.

11. In combination, a car truck, a pair of substantially parallel bars secured thereto and extending substantially at right angles to the car axle, a pair of substantially parallel U-shaped slings pivotally suspended from said bars substantially at right angles thereto, a dynamo electric machine carried by said slings and adapted to maintain the same in parallel relation.

12. In combination, a car truck, a pair of substantially parallel bars secured thereto and extending substantially at right angles to the car axle, a pair of substantially parallel U-shaped slings pivotally supported by said bars substantially at right angles thereto, a dynamo electric machine carried by said slings and adapted to maintain the same in parallel relation, and a tension device tending to move said slings away from the car axle.

13. In combination, a car truck, a pair of substantially parallel bars secured thereto and extending substantially at right angles to the car axle, a pair of substantially parallel U-shaped slings pivotally suspended from said bars substantially at right angles thereto, a dynamo electric machine carried by said slings and adapted to hold the same in parallel relation, one of said bars having a downwardly extending portion, a rod connected to one of said slings and extending through the downwardly extending portion of said bar, a tension nut threaded onto said rod, and a tension spring surrounding said rod and interposed between said bar and said tension nut.

14. Supporting means for a car lighting generator including in combination, a car truck, a pair of substantially parallel supporting bars secured thereto and extending substantially at right angles to the car axle, a pair of substantially U-shaped slings pivotally supported by said bar and held in spaced relation, said slings being arranged substantially parallel to the car axle, and means for adjusting said slings longitudinally of said bars.

15. Supporting means for a car lighting generator including in combination, a car truck, a pair of substantially parallel supporting bars secured thereto and extending substantially at right angles to the car axle, a pair of substantially parallel U-shaped members pivotally supported by said bars and held in spaced relation, said members being arranged substantially parallel to the car axle, and means for independently adjusting either end of said members longitudinally of said bars.

16. In combination, a car truck, a pair of substantially parallel supporting bars secured thereto and extending substantially at right angles to the car axle, a pair of substantially U-shaped slings pivotally supported by said bars and held in spaced relation, said slings being arranged substantially parallel to the car axle, and means for independently adjusting either end of said slings longitudinally of said bars, and a generator supported by said slings and adapted to hold the same in parallel relation, said generator being adjustable longitudinally of said slings.

17. Supporting means for a car lighting generator including in combination, a car truck, a pair of substantially parallel supporting bars secured thereto and extending substantially at right angles to the car axle, sliding members carried by said bars and movable longitudinally thereof, a pair of supporting members pivotally supported by said sliding members and arranged substantially parallel to the car axle, said bars having downwardly extending portions and connections between the same and said sliding members for adjusting said supporting members longitudinally of said bars.

18. Supporting means for a car lighting generator including in combination, a car truck, a pair of substantially parallel supporting bars secured thereto and extending substantially at right angles to the car axle, sliding members carried by said bars and movable longitudinally thereof, a pair of supporting members pivotally supported by said sliding members and arranged substantially parallel to the car axle, said bars having downwardly extending portions, connections between the same and said sliding members for adjusting said members longitudinally of said bars, and a tension device connecting each of the downwardly extending portions of said bars to one of said supporting members.

19. Supporting means for a car lighting generator including in combination, a car truck, a pair of substantially parallel supporting bars secured thereto and extending substantially at right angles to the car axle, sliding members carried by said bars and movable longitudinally thereof, a pair of substantially parallel supporting members pivotally supported by said sliding members and arranged substantially parallel to the car axle, said bars having downwardly extending portions, connections between the same and said sliding members for adjusting said members longitudinally of said bars, a tension device connecting each of the downwardly extending portions of said bars to one of said supporting members, and a generator carried by said supporting members and adapted to maintain the same in spaced and parallel relation, said generator being adjustable longitudinally of said supporting members.

20. A device for mounting dynamo electric machines on car trucks, comprising among its members a pair of substantially parallel bars adapted to be secured to the car truck and provided at their ends with downwardly extending portions, said downwardly extending portions having their extremities twisted at right-angles thereto, a generator suspended from said parallel bars and a resilient connection between said generator and said twisted extremities, tending to swing said generator away from the car axle.

21. A device for mounting dynamo electric machines on car trucks, comprising among its members a pair of substantially parallel bars adapted to be secured to the car truck and provided at their ends with downwardly extending portions, the extremities of said downwardly extending portions being arranged transversely with respect to said bars, a generator supported in a swinging carriage between said downwardly extending portions and said car truck, and means coöperating with said generator and said downwardly extending portions for maintaining the tension on the driving belt.

22. A device for mounting dynamo electric machines on car trucks, comprising among its members a bar adapted to be secured to the car truck and provided at its end with a substantially perpendicular portion having its extremity arranged substantially at right-angles thereto, an adjusting rod sliding loosely through an opening in said twisted extremity and normally coöperating with a spring tensioning device, and a block secured to said substantially perpendicular portion adapted to receive a screw-threaded rod for purposes of adjustment.

23. A generator suspension including substantially parallel bars adapted to be secured to a car truck, a generator suspended from said bars and diagonal braces for the outer ends of said bars whereby the necessary rigidity of said ends is secured and whereby the usual end cross-bar is eliminated thereby permitting unobstructed access to the upper and outer portions of said generator.

24. A generator suspension including a pair of substantially parallel bars adapted to be secured to a car truck, a generator supported by slings adjacent the outer ends of said bars, said bars being braced at their outer ends by diagonal braces only, whereby the usual end cross-bar is eliminated and whereby unobstructed access to said generator from above and beyond the same is provided.

25. In a support for dynamo electric machines, in combination, a pair of cross-bars pivotally suspended from a car truck outside the same, and a dynamo resting on said cross-bars and removably secured thereto, whereby it may be lifted therefrom.

26. In a support for dynamo electric machines, in combination, a pair of substantially parallel supporting bars projecting from a car truck, a plurality of cross-bars pivotally suspended from said supporting bars beyond said truck, and a generator carried by said cross-bars and removable therefrom without disturbing the arrangement thereof.

27. In a generator support, parallel suspension bars, a swinging carriage connecting the ends of said bars and pivoted thereto, and a generator supported by said carriage and adjustable along the same.

28. The combination with a car truck, of a pair of suspension bars projecting therefrom, a swinging cradle pivoted to said bars and a generator removably carried by said cradle.

29. The combination with a car truck, of a pair of suspension bars projecting beyond the end thereof, a pair of substantially parallel supporting devices secured to said bars beyond the end of said truck and adjustable with respect to said bars, and a generator adjustably supported on said devices and maintaining them in spaced relation.

30. A generator suspension comprising depending pivoted links arranged at opposite sides of the suspension, a generator carried thereby, means enabling independent adjustment of said links longitudinally, and a resilient member connected with the swinging parts of the apparatus.

31. A generator suspension adapted for a car truck and extending beyond the end of said truck, comprising a swinging cradle suspended beyond the end of said truck, and a generator adjustably mounted in said cradle to provide ready access to said generator and adjustments.

32. A generator suspension having parallel suspension bars with downwardly extending ends, pivoted links carried by each of said bars, a generator supported by said links and a resilient connection between said downwardly extending ends and said links.

33. A generator suspension comprising cross-bars suspended by pivoted links and a generator removably carried on said crossbars.

34. A suspension for an axle driven generator adapted for adjustment toward and away from the driving axle, comprising cross-bars on which said generator is removably mounted, and pivoted links supporting the ends of said cross-bars whereby said generator may swing to various positions of adjustment.

35. A generator suspension adapted to permit adjustment of the generator longitudinally, transversely and in an arc, including links pivotally suspended, cross-bars supported thereby on which a generator is slidably mounted, and means for moving the pivotal supports.

36. An adjustable generator suspension for permitting adjustment of the generator to a position parallel to a driving axle and toward and away from the same, including links for suspending said generator at opposite ends, and means for independently adjusting the point of support of the opposite links toward and away from said axle.

37. A generator suspension including a swinging carriage supported from above and a generator detachably secured to said carriage whereby it may be removed therefrom without disturbing said carriage.

38. A generator suspension including a carriage supported from above, a generator removably mounted on said carriage and adjustable longitudinally with respect thereto.

39. A generator suspension including a swinging frame suspended in proximity to a car axle, a generator removably carried by said frame and means for adjusting said frame toward and away from said axle.

40. A generator suspension comprising a swinging frame suspended in proximity to a car axle, a generator removably secured to said frame and adjustable longitudinally with respect to said frame, and means for adjusting said frame bodily toward and away from said axle.

41. A generator suspension including a swinging frame suspended in proximity to a car axle, a generator removably carried by said frame and means for independently adjusting either end of said frame toward and away from said axle.

42. A generator suspension including a swinging carriage supported adjacent to a car axle, a generator removably mounted on said carriage, means for adjusting said carriage toward and away from said axle, and a tension device tending to swing said carriage away from said axle.

43. A generator suspension including a swinging carriage suspended in proximity to a car axle, a generator resting on portions of said carriage and adapted to be readily lifted therefrom but normally clamped thereto in any one of a number of positions of longitudinal adjustment with respect thereto, means for independently adjusting either end of said carriage toward or away from said axle, and a tension device normally tending to swing said carriage away from said axle.

44. A generator suspension including a carriage which includes two frames suspended from above in parallel planes, a generator having projecting lugs on opposite sides which are seated on the lower portions of said frames, whereby said frames are maintained in spaced parallel relation and whereby said generator remains upright while swinging to various positions of adjustment, and attaching means removably secured to said lugs whereby said generator may be lifted from said frames.

45. A generator suspension including two pairs of depending pivoted links, one pair being arranged at each side of the suspension, a pair of cross-bars secured to the opposite links at their lower ends, and a generator removably mounted upon said cross-bars.

46. A generator suspension including two pairs of depending pivoted links, one pair being arranged at each side of the suspension, a pair of cross-bars secured to the opposite links at their lower ends, and a generator removably mounted upon said cross-bars and adjustable along the same.

47. A generator suspension including two pairs of depending pivoted links, one pair being arranged at each side of the suspension, a pair of cross-bars secured to the opposite links at their lower ends, a generator removably mounted upon said cross-bars and means for adjusting said links transversely with respect to the generator armature shaft.

48. A generator suspension including two pairs of depending pivoted links, one pair being arranged at each side of the suspension, a pair of cross-bars secured to the opposite links at their lower ends, a generator removably mounted upon said cross-bars and means for independently adjusting either of said pairs of links transversely with respect to the generator armature shaft.

49. A generator suspension including two pairs of depending pivoted links, one pair being arranged at each side of the suspension, a pair of cross-bars connecting the opposite links at the lower ends, a generator removably mounted upon said cross-bars, and resilient means coöperating with said links for adjusting the tension of the driving belt.

50. A generator suspension including two pairs of depending pivoted links, one pair being arranged at each side of the suspension, a pair of cross-bars connecting the opposite links at their lower ends, a generator removably mounted upon said cross-bars and adjustable along the same, and resilient means coöperating with said links for adjusting the tension of the driving belt.

51. A generator suspension including two pairs of depending pivoted links, one pair being arranged at each side of the suspension, a pair of cross-bars connecting the opposite links at the lower ends, a generator removably mounted upon said cross-bars, means for adjusting said links transversely with respect to the generator armature shaft, and resilient means coöperating with said links for adjusting the tension of the driving belt.

52. A generator suspension including two pairs of depending pivoted links, one pair being arranged at each side of the suspension, a pair of cross-bars connecting the opposite links at the lower ends, a generator removably mounted upon said cross-bars, means for independently adjusting either of said pairs of links transversely with respect to the generator armature shaft, and resilient means coöperating with said links for adjusting the tension of the driving belt.

53. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, and means connected to said links adjacent their lower ends for supporting a generator.

54. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, and means connected to said links adjacent their lower ends for supporting a generator, said generator being adjustable along said means.

55. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, and means connected to said links adjacent their lower ends for supporting a generator, said links being adjustable along said suspension members to move the generator toward and away from the driving axle.

56. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, and means connected to said links adjacent their lower ends for supporting a generator, said generator being adjustable along said means and said links being adjustable along said suspension members.

57. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, the links on one side being adjustable along one member independently of the links along the other side, means connected to said links adjacent their lower ends for supporting a generator, and a tension device tending to swing said generator away from the driving axle.

58. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, and cross-bars connected to the lower ends of said links to support a generator.

59. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, and cross-bars connected to the lower ends of said links to support a generator, said generator being adjustable along said cross-bars.

60. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, and cross-bars connected to the lower ends of said links to support a generator, said links being adjustable along said suspension members.

61. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, and cross-bars connected to the lower ends of said links to support a generator, said generator being adjustable along said cross-bars and said links being adjustable along said suspension members.

62. A generator suspension for supporting an axle driven generator on a car truck and beyond the end thereof including suspension members adapted to be supported by the car truck and to have their ends protrude beyond the end thereof, depending pivoted links carried by said suspension members beyond the end of said truck, the links on one side being adjustable along one member independently of the links on the other side, cross-bars connected to the lower ends of said links for supporting a generator and a tension device tending to swing said generator away from the driving axle.

63. A suspension for an axle driven generator including parallel suspension bars, depending pivoted links supported by said bars, means secured to said links for supporting a generator, and a longitudinally adjustable member associated with each suspension bar and coöperating with said links to move the same toward and away from the driving axle.

64. A generator suspension for supporting an axle-driven generator on a car truck including a pair of suspension bars adapted to be spaced apart and be attached to the car truck and protrude beyond the end thereof, a pair of depending pivoted links carried by each of said bars beyond the end of said truck and a pair of cross bars carried by said links, each cross-bar being connected to the lower ends of two opposite links, and adapted to carry an axle-driven generator.

65. A generaor suspension for supporting an axle-driven generator on a car truck including a pair of suspension bars adapted to be spaced apart and be attached to the car truck and protrude beyond the end thereof, a pair of depending pivoted links carried by each of said bars beyond the end of said truck and adjustable along said bars, and a pair of cross bars carried by said links, each cross bar being connected to the lower ends of two opposite links and adapted to carry an axle-driven generator.

66. A generator suspension for supporting an axle-driven generator on a car truck including a pair of suspension bars adapted to be spaced apart and attached to the car truck and protruding beyond the end thereof, a pair of depending pivoted links carried by each of said bars beyond the end of said truck and adjustable along said bars, a pair of cross bars carried by said links, each cross-bar being connected to the lower ends of two opposite links and adapted to carry an axle-driven generator, said generator being adjustable along said cross-bars.

67. A generator suspension for carrying a car lighting generator upon a car truck having slings each made up of depending links and a cross-bar, the cross-bars serving to carry the generator.

68. In combination, a car truck and a generator support carried thereby, said support including slings detachably secured to the truck, said slings being constructed with depending links and cross-bars between said links, and a generator removably mounted on said cross-bars.

69. In combination, a car truck and a generator support carried thereby, said support including slings carried by the truck, said slings being constructed with depending links and cross-bars between said links, said cross-bars being adapted to removably support a generator.

70. Means for supporting a car lighting generator beyond the end of a car truck including, in combination with the truck, supporting means projecting beyond the end of the truck and pivoted links supported by said means at points outside of the truck, said links being adapted to support the generator.

In witness whereof, I have hereunto subscribed my name in the presence of two witnesses.

WILLIAM L. BLISS.

Witnesses:
C. E. MEAD,
E. P. HARRIG.